US008521196B2

(12) United States Patent
Wang

(10) Patent No.: US 8,521,196 B2
(45) Date of Patent: Aug. 27, 2013

(54) METHOD AND SYSTEM FOR IMPLEMENTING MULTIMEDIA BROADCAST/MULTICAST SERVICE

(75) Inventor: Rui Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1524 days.

(21) Appl. No.: 11/764,329

(22) Filed: Jun. 18, 2007

(65) Prior Publication Data
US 2007/0293249 A1 Dec. 20, 2007

(30) Foreign Application Priority Data
Jun. 19, 2006 (CN) .......................... 2006 1 0061212

(51) Int. Cl.
*H04W 4/00* (2009.01)
(52) U.S. Cl.
USPC ........ 455/466; 455/435.2; 455/414; 455/450; 455/454
(58) Field of Classification Search
USPC ....................... 455/466, 435.2, 414, 450, 454
See application file for complete search history.

(56) References Cited

U.S. PATENT DOCUMENTS

| 7,162,241 B2 * | 1/2007 | Kim et al. ................... 455/435.2 |
| 2003/0134622 A1 * | 7/2003 | Hsu et al. ....................... 455/414 |
| 2004/0008646 A1 | 1/2004 | Park et al. |
| 2004/0203816 A1 * | 10/2004 | Bae et al. ....................... 455/450 |
| 2005/0037767 A1 | 2/2005 | Kim et al. |
| 2005/0043050 A1 | 2/2005 | Lee et al. |
| 2005/0068963 A1 | 3/2005 | Lee et al. |
| 2005/0083884 A1 | 4/2005 | Lee et al. |
| 2005/0118992 A1 | 6/2005 | Jeong et al. |
| 2005/0170842 A1 * | 8/2005 | Chen ............................. 455/454 |
| 2006/0034215 A1 * | 2/2006 | Moon et al. ................... 370/328 |
| 2006/0274780 A1 | 12/2006 | Walsh et al. |

FOREIGN PATENT DOCUMENTS

| CN | 1451250 A | 10/2003 |
| CN | 1455538 A | 11/2003 |
| CN | 1518255 A | 8/2004 |
| CN | 100454819 C | 1/2009 |
| EP | 1387591 A | 2/2004 |
| EP | 1392075 A | 2/2004 |
| EP | 1 507 364 A2 | 2/2005 |

(Continued)

OTHER PUBLICATIONS

3GPP TS 23.246 V6.10.0 (Jun. 2006), 3rd Generation Partnership Project.*

(Continued)

*Primary Examiner* — David Q Nguyen
(74) *Attorney, Agent, or Firm* — Leydig, Voit & Mayer, Ltd.

(57) ABSTRACT

A method and a system for implementing MBMS. According to embodiments of the present invention, the MBMS are born on different multimedia broadcast multicast bearers; each multimedia broadcast multicast bearers corresponds to a multimedia broadcast multicast area; an association relationship between the different multimedia broadcast multicast bearers of MBMS of a same type is set at a network side; when the UE switches between different multimedia broadcast multicast areas, the network side provides the UE with the multimedia broadcast multicast bearer of the multimedia broadcast multicast area where the UE is located currently according to the association relationship between the multimedia broadcast multicast bearers corresponding to the MBMS request by the UE. The method and the system in accordance with the present invention can support MBMS better.

17 Claims, 7 Drawing Sheets

(56) References Cited

FOREIGN PATENT DOCUMENTS

| EP | 1659819 A | 5/2006 |
|---|---|---|
| WO | WO 2004/064342 A1 | 7/2004 |
| WO | WO 2004/088997 A2 | 10/2004 |
| WO | WO 2005/032199 A1 | 4/2005 |

OTHER PUBLICATIONS

First Office Action in counterpart Chinese Application No. 200780000363.3, mailed Jul. 13, 2010.
Written Opinion in counterpart PCT Application No. PCT/CN2007/001438, mailed Aug. 9, 2007.

"3$^{rd}$ Generation Partnership Project; Technical Specification Group Services and System Aspects; Multimedia Broadcast/Multicast Service (MBMS); Architecture and functional description (Release 6)," *3GPP*, 3GPP TS 23.246 V6.9.0 (Dec. 2005).
"3$^{rd}$ Generation Partnership Project; Technical Specification Group Services and System Aspects; 3GPP System Architecture Evolution: Report on Technical Options and Conclusions (Release 7)," *3GPP*, 3GPP TR 23.882 V1.0.0 (Mar. 2006).
2$^{nd}$ Office Action in corresponding Chinese Application No. 200780000363.3 (Dec. 31, 2010).

* cited by examiner

METHOD AND SYSTEM FOR IMPLEMENTING MULTIMEDIA BROADCAST/MULTICAST SERVICE

This application claims priority to Chinese Patent Application No. 200610061212.6, filed Jun. 19, 2006, which are hereby incorporated by reference.

FIELD OF THE TECHNOLOGY

The present invention relates to Multimedia Broadcast/Multicast Service (MBMS) in communication networks, and in particular, to a method and a system for implementing MBMS when a User Equipment (UE) switching between MBMS service areas.

BACKGROUND OF THE INVENTION

The $3^{rd}$ Generation Partnership Project (3GPP), as a standardization organization drafting $3^{rd}$ communication technology standards, has provided on the core network an ability to broadcast and multicast multimedia since R6 version. The specific implementation is that, a new network element, i.e. a Broadcast Multicast Service Centre (BM-SC) is added to the core network to serve as a data source of MBMS in UMTS networks. The BM-SC is used to manage MBMS, for example, to provide a membership function, a session and transmission function, a proxy and transport function, a service announcement function, a security function, etc. The BM-SC is connected with a GPRS Gateway Service Node (GGSN) directly so as to send the MBMS data to the UMTS networks.

After the R6 version, 3GPP evolved network may also provide the ability of broadcast and multicast through such processes as MBMS registration, MBMS session start, MBMS data transfer, MBMS session stop, MBMS de-registration, etc. Additionally, the 3GPP evolved network may support multicast services from Internet as well, so that the multicast services from Internet are allowed to transmit on the 3GPP evolved network.

In the 3GPP evolved network, the MBMS may implement an entire MBMS multicast services through such processes as subscription, service announcement, joining, session start, MBMS notification, data transfer, session stop, leaving, etc. A node in charge of transmitting data and signaling needs to use two parameters: MBMS UE Context and MBMS Bearer Context, wherein the MBMS UE Context is associated with a UE, and the MBMS Bearer Context is associated with a bearer.

When a first UE registers on a node, the node establishes an MBMS Bearer Context and registers to its upstream node. In each MBMS Bearer Context, there is set a list of downstream nodes. On receiving a registration request from its downstream node, the node adds the downstream node to the list of downstream nodes. If there are some data and signaling to be transmitted in a downstream direction, the node uses its list of downstream nodes to establish a bearer with its downstream nodes, and issues the contents such as data, signaling, etc. to its downstream nodes through the bearer.

According to the existing multicast technology, each multicast service defines a multicast area. Subscribers can receive the multicast service only in the multicast area. The multicast area includes a plurality of local multicast areas. Data played in different local multicast areas by multicast services of a same type may be different, which is implemented through different multicast bearers. For example, multicast services of the same type can be transmitted through multiple multicast bearers, and different local multicast areas use different multicast bearers to distribute data of the multicast services of the same type.

Thus, if the local multicast area where the subscriber is located is changed, the data corresponding to the multicast services of the type are expected to be changed correspondingly. Taking the multicast service such as a "weather forecast" as an example, if a subscriber subscribes the "weather forecast" in Beijing, and then roams to Shanghai, the subscriber will want to receive the weather forecast of Shanghai; in other words, the subscriber wants to receive the weather forecast of Beijing in Beijing, and receive the weather forecast of Shanghai in Shanghai.

However, the actual situation is that, after registering at an original local multicast area, if the subscriber leaves the original local multicast area and enters a new local multicast area, the multicast service needed by the subscriber is interrupted, since the multicast bearers used in the two local multicast areas can not establish connections with each other due to the use of different service identifiers (IDs). If the subscriber wishes to continue the multicast service in the new local multicast area, the subscriber has to receive a service announcement through the multicast bearer in the new local multicast area, and access the multicast service of the type again. The service announcement includes parameters such as a service ID, a multicast address (referring to the address of the multicast source providing the multicast service), and so on. The above-mentioned process relates to some subscriber's operations such as re-registration and the like, which makes the subscriber inconvenient, and is possible to be an obstacle of receiving multicast services.

Even if the subscriber leaves the original local multicast area and enters the new local multicast area after receiving the service announcement in the original local multicast area and acquiring access parameters (for example, the multicast address, etc.), the subscriber can not acquire the multicast service at the new local multicast area using the multicast address acquired before.

SUMMARY OF THE INVENTION

A method for implementing Multimedia Broadcast/Multicast Service MBMS according to one or more embodiments of the present invention, wherein MBMS are born on different multimedia broadcast multicast bearers, and each multimedia broadcast multicast bearer corresponds to a multimedia broadcast multicast area; the method includes:

establishing an association relationship between different multimedia broadcast multicast bearers associated with MBMS of a same type at a network side; and in response to a User Equipment UE switching between different multimedia broadcast multicast areas, the network side providing the UE with a multimedia broadcast multicast bearer of a multimedia broadcast multicast area where the UE is located currently, according to the association relationship between the different multimedia broadcast multicast bearers corresponding to the MBMS requested by the UE.

A system for implementing Multimedia Broadcast/Multicast Service MBMS, includes:

at least one User Equipment (UE) receiving MBMS, and switching between different MBMS service areas;

a first network unit for establishing an association relationship between different MBMS bearers of MBMS of a same type, wherein the MBMS of the type are born on different MBMS bearers, and each MBMS bearer corresponds to one MBMS service area; and a second network unit for providing the UE with the multimedia broadcast multicast bearer of the multimedia broadcast multicast area where the UE is located, according to the association relationship between the different multimedia broadcast multicast bearers corresponding to the MBMS requested by the UE.

EMBODIMENTS OF THE INVENTION

A detailed description of the embodiments in accordance with the present invention is provided hereinafter with reference to the attached drawings.

Figure 1:
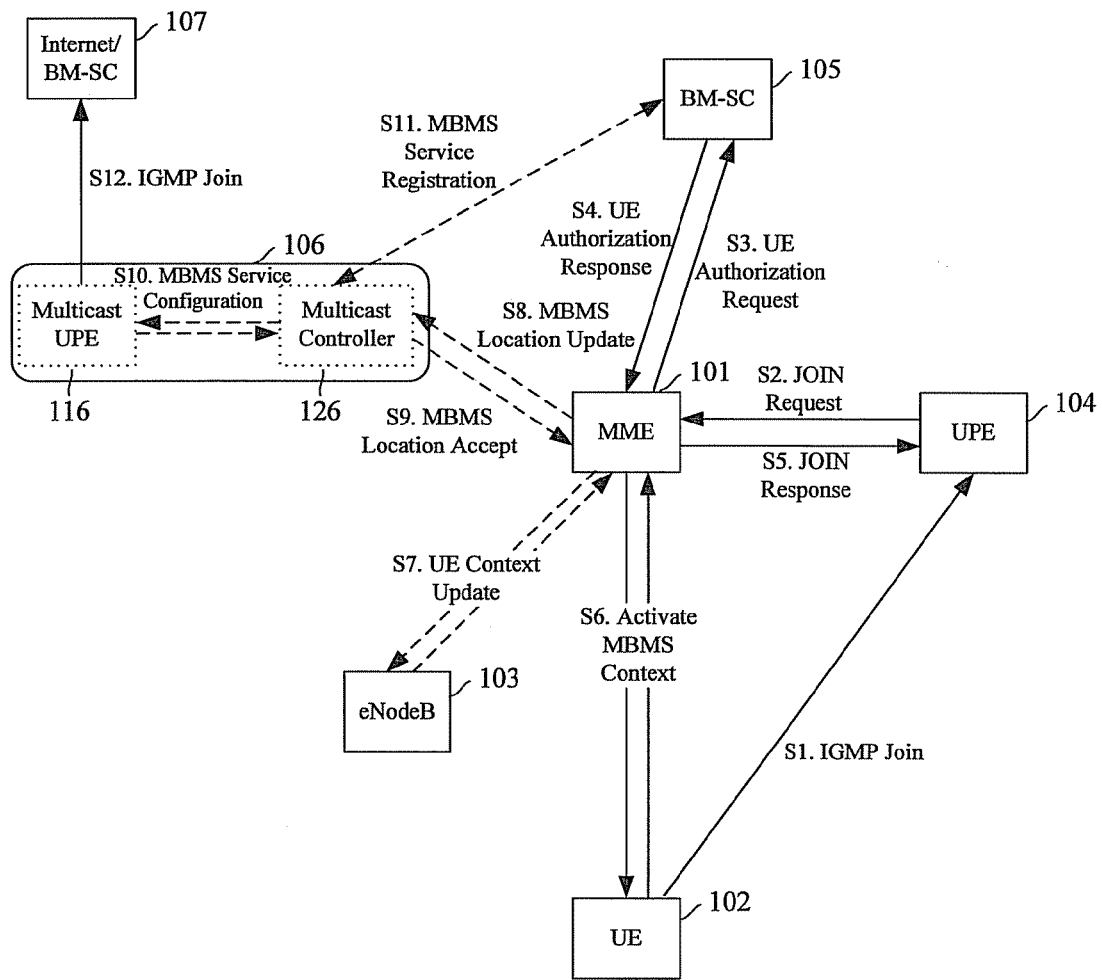
FIG. 1 shows a network architecture for providing multicast services and a registration process of multicast services.

As shown in FIG. 1, a network for providing multicast services, such as the 3GPP evolved network, includes the following entities (in the following description, network components except the UE are referred to as "network side"):

a Mobility Management Entity (MME) 101, for managing the mobility of UE 102; an eNodeB 103 which is an entity in an access network and is in charge of data transmission.

a User Plane Entity (UPE) 104 as an entity in a core network, which is in charge of data transmission. In the 3GPP evolved networks, the UPE may be connected with a PDN including Internet 105. In actual applications, not all UPEs need to support the ability of broadcast and multicast. The UPEs supporting the ability of broadcast and multicast are referred to as a Multicast UPE116, which provide the ability of broadcast and multicast with the assistance of a Multicast Controller 126. The Multicast UPE and the Multicast Controller form a Multimedia Multicast Broadcast Service (MBMS) entity 106. The MBMS entity implements the MBMS multicast services through such processes as subscription, service announcement, joining, session start, MBMS notification, data transfer, session stop and leaving, etc.

A Broadcast Multicast Service Centre (BM-SC) 107 is the source providing broadcast multicast data in a UMTS network. The BM-SC may be connected with the MME and the Multicast Controller directly, so as to transmit the broadcast multicast data to the UMTS network. The BM-SC is equipped with the functions of managing MBMS, such as the membership function, the session and transmission function, the proxy and transport function, the service announcement function, the security function, etc.

In the network as shown in FIG. 1, there is provided a method for implementing MBMS. Different multicast services of a same type are born on different multicast bearers, each of which corresponds to a local multicast area. It should be noted that, the data of the multicast services of the same type differ in different local multicast areas. For example, the multicast services of a certain type may be weather forecast, and the contents of the weather forecast in connection with two local multicast areas, Beijing and Tianjin, are different.

The following descriptions take the multicast services as an example. It should be noted that, the following embodiments also apply to broadcast services. In other words, the embodiments of the present invention apply to MBMS.

In order to implement the above-mentioned multicast services, it is necessary to associate different multicast bearers of the multicast services of a same type. If a UE switches between different local multicast areas, the network side establishes or updates an MBMS Context according to the association relationship between different multicast bearers, and establishes a corresponding multicast bearer according to the MBMS Context, so that the data of the multicast services can be provided for the UE in the new local multicast area. The MBMS Context may be an MBMS UE Context and/or an MBMS Bearer Context.

Figure 2:
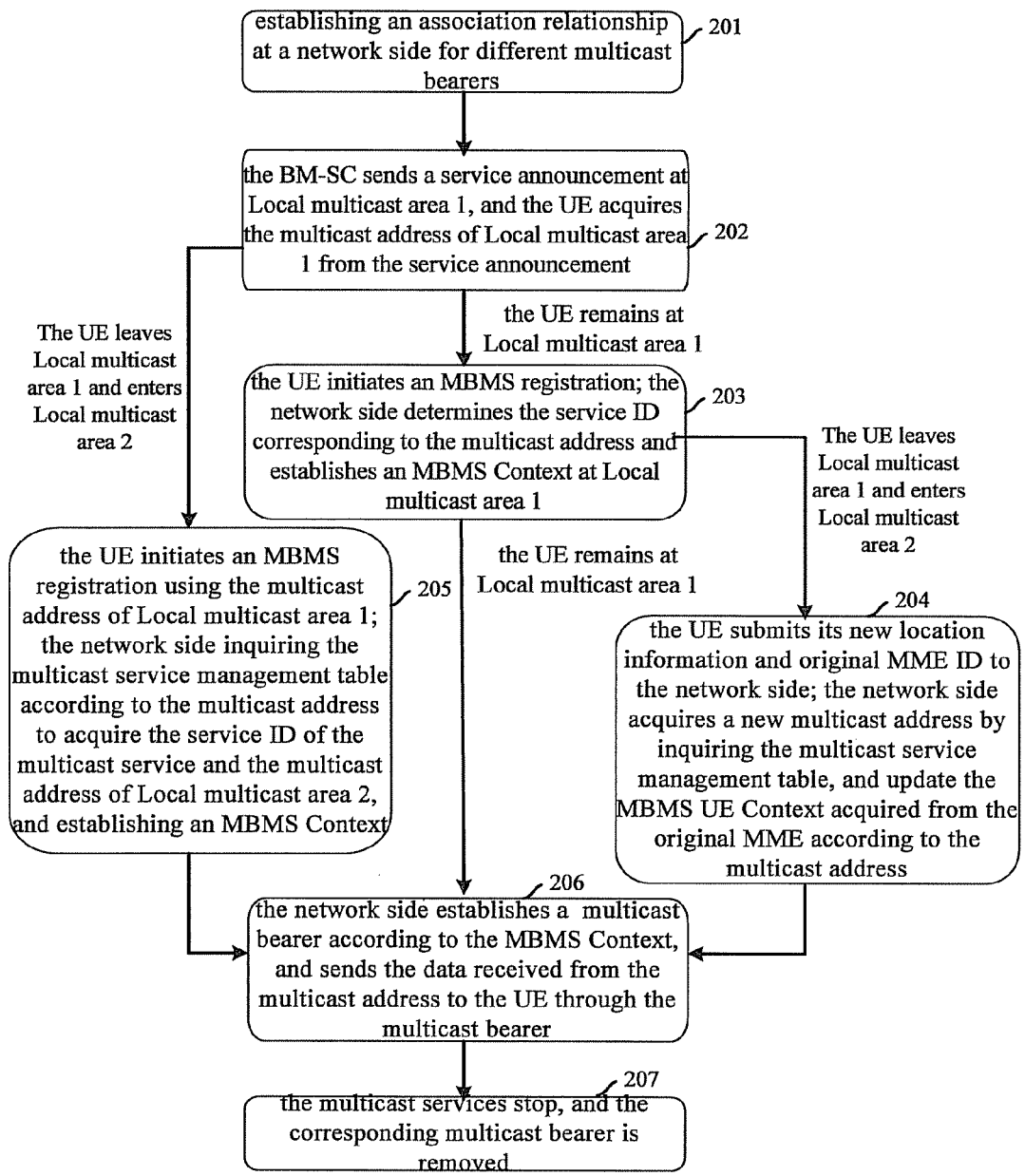
FIG. 2 is a flow chart illustrating the process of implementing multicast services in an embodiment of the present invention.

FIG. 2 illustrates a process of implementing multicast services according to an embodiment of the present invention, which specifically includes:

Block 201: establishing an association relationship at a network side for different multicast bearers.

As an example, a service ID is set at the network side for the multicast services of a same type, and different multicast bearers of the multicast services of the same type all correspond to the service ID. For another example, different service IDs may be used to indicate different multicast bearers of the multicast services of a same type, and the different service IDs are set as equivalence to associate the above-mentioned multicast bearers.

In specific implementation, a multicast service management table can be set in the BM-SC. The multicast service management table records corresponding relationship among service IDs, local multicast areas and multicast addresses, wherein the multicast address points to a Multicast Source (MCS) providing multicast services. In a local multicast area, there may be multiple MCSs for providing data of multicast services of a same type.

For instance, in the multicast service management table as shown in Table 1-a, a certain service ID corresponds to multiple multicast bearers of multiple multicast addresses. Each multicast bearer only provides data of the multicast services in a designated local multicast area. It should be noted that, although the multicast bearers corresponding to a same service ID provide the multicast services of a same type, the data of these multicast services may be different.

TABLE 1-a

| Service ID | local multicast area | Multicast address |
| --- | --- | --- |
|  |  |  |

For another example, corresponding service IDs are set for multiple different local multicast areas, and the corresponding service IDs are set as equivalence service IDs. A multicast service management table, which is set in the BM-SC, records corresponding relationship among service IDs, local multicast areas and Multicast addresses, as well as the equivalence relationship between service IDs (Table 1-b is referred to as to one specific example of the equivalence relationship).

TABLE 1-b

| Equivalence service ID | local multicast area | Multicast address |
|---|---|---|
| | | |

Of course, the association relationship between different multicast bearers can be established in other manners.

Block 202: a subscriber subscribing a multicast service through Web, short messages and the like.

Before providing a multicast service, the BM-SC sends service announcements for different local multicast areas. The service announcement includes the multicast address of the local multicast area. A User Equipment (UE) may learn the multicast address of the local multicast area where the UE is currently located (provided that it is Local multicast area 1) from the service announcement.

After acquiring the multicast address, if the UE leaves Local multicast area 1, and enters a Local multicast area 2 before initiating the MBMS registration, the process advances to Block 205. In this case, the multicast address recorded by the UE is the multicast address of Local multicast area 1, but the UE is located in Local multicast area 2.

If the UE does not leave Local multicast area 1 before initiating the MBMS registration, the process advances to Block 203.

Block 203: the UE initiating the MBMS registration; the network side determining a service ID corresponding to the acquired multicast address of the UE, and establishing an MBMS UE Context and an MBMS Bearer Context in Local multicast area 1.

This step is specifically implemented as follows. Before the multicast service starts, the UE uses the multicast address of Local multicast area 1 to send a multicast join signaling (IGMP Join) (S1). Upon receiving the IGMP Join, the UPE sends a join request (Join Request) to the MME (S2). The MME sends the UE's ID and the multicast address to the BM-SC for authorization (S3).

The BM-SC authenticats the UE, determines a service ID corresponding to the multicast address provided by the UE, and sends the authorization result and the service ID to the MME (S4). The MME establishes an MBMS UE Context with the UE, sends the service ID to the UE, and initiates an operation of activating the context (S6). The UE sends an Activate MBMS Context Request to the MME to inform the MME about the location information of the UE. Upon receiving the request, the MME acquires the local multicast area where the UE is currently located and the corresponding multicast address by inquiring the BM-SC.

The MME notifies information related to the multicast service to an eNodeB and a Multicast Controller which provides a multicast bearer for the UE (S7 and S8), wherein the information related to the multicast service includes a local multicast area ID, a multicast address, and a service ID. After the MBMS Bearer Context is established on the eNodeB and the Multicast Controller, the Multicast UPE sends a service join message to the MCS indicated by the multicast address (S12), wherein the MBMS Bearer Context includes a service ID, a local multicast area, and a multicast address. One example of the MBMS Bearer Context is as shown in Table 2.

TABLE 2

| Service ID | local multicast area | APN | Multicast address | List of downstream nodes |
|---|---|---|---|---|
| | | | | |

After the MBMS UE Context is established, if the UE leaves Local multicast area 1 at any time before the multicast service is finished, the process advances to Block 204; if the UE remains at Local multicast area 1, the process advances to Block 206.

That is to say, the wording "leave" refers to that the UE leaves immediately after the MBMS UE Context is established, or leaves during the procedure of receiving the data of the multicast service.

Block 204: The UE leaves Local multicast area 1 and enters Local multicast area 2, and then the UE submits its new location information and an original MME ID to the network side; the network side acquires a new multicast address (i.e. the multicast address of Local multicast area 2) by inquiring the multicast service management table, and updates the MBMS UE Context acquired from the original MME according to the new multicast address, and then the process advances to Block 206.

The step can be specifically implemented as follows. The network side acquires the MBMS UE Context stored on the original MME according to the original MME ID and the location information of the UE, acquires the service ID from the MBMS UE Context, searches the multicast management table according to the location information of the UE and the service ID, and acquires a new multicast address corresponding to Local multicast area 2. The network side updates the MBMS UE Context according to the new multicast address, and the UE also updates the MBMS UE Context stored on the UE.

As to the UE, after the MBMS UE Context is modified, the UE is able to continue receiving the data of the multicast service from the new multicast address, thereby avoiding the interruption of the multicast service.

For the MME, the MME notifies the network node UPE, the Multicast Controller and the eNodeB in Local multicast area 2 that the UE has left Local multicast area 1, and entered Local multicast area 2.

If there are other subscribers in Local multicast area 2 applying for the multicast services of the type, the existing MBMS Bearer Context can be used directly. Otherwise, a new MBMS Bearer Context should be established. For example, if there is no other subscribers applying for the multicast service corresponding to the new multicast address in Local multicast area 2, namely the UE is the first subscriber applying for the multicast service, an MBMS Bearer Context is to be established at this time.

Further, in the case that a same service ID is used to indicate the multicast services of a same type, different local multicast areas and multicast addresses all correspond to a same service ID. If there is another subscriber applied for the multicast service of the type in another local multicast area (other than Local multicast area 2), nodes in the another local multicast areas have established an MBMS Bearer Context. However, the established MBMS Bearer Context is not in connection with Local multicast area 2. Therefore, the MBMS Bearer Context of Local multicast area 2 should be added, and be designated to the same service ID.

In actual applications, the MBMS UE Context is used to instruct the UE on how to receive the multicast service. It should be noted that, the MBMS UE Context is not necessary. For instance, if the UE has learnt how to receive the multicast service in the access network, the MBMS UE Context can be omitted. In the case that the MBMS UE Context is not used, the UE submits the Service ID and the location information; the network side authorizes the UE, and provides a new service access manner for the UE; and the UE continues to receive the multicast service provided by the network side in the local multicast area where the UE is located presently. The network node providing the service access manner for the UE may be the MME, the eNodeB, or other entities.

Block 205: the UE initiates an MBMS registration with the multicast address of Local multicast area 1. The network side acquires the service ID of the multicast service of the type by inquiring the multicast service management table according to the multicast address. During the establishment the MBMS UE Context, the network side acquires the location information of the UE, thereby determines the ID of the local multicast area where the UE is located currently (i.e. Local multicast area 2). The network side then acquires the new multicast address by inquiring the multicast service management table according to the service ID and the ID of Local multicast area 2, thereby completes the establishment of the MBMS UE Context.

Block 206: upon receiving the data from a certain multicast source on the Internet, the UPE initiates a Session Start procedure. The network side establishes a corresponding multicast bearer according to the MBMS Bearer Context, and sends the data received from the multicast address to the UE through the multicast bearer.

The process of the network side establishing the multicast bearer means that the multicast bearer is established between the UPE and the eNodeB based on the multicast address recorded in the MBMS Bearer Context on the UPE and the eNodeB.

If a UPE is able to receive the data sent from a plurality of multicast sources, the UPE establishes respective multicast bearers for different multicast sources according to the corresponding multicast addresses, and the data received from the different multicast addresses are transmitted through the corresponding multicast bearers. Thus, a column of UPE ID can be added to Table 1-a and Table 1-b, indicating the UPE through which the multicast source provides the multicast service in the corresponding local multicast area. When updating the location, the MME will send the related information of the multicast service subscribed by the UE to the Multicast UPE designated by Table 1.

Further, the process of the embodiment may further include:

Block 207: when the multicast service stops, the corresponding multicast bearer is removed.

The process of removing the multicast bearer relates to the configuration of the multicast service management table. If the multicast service management table is configured in the format as shown in Table 1-a, i.e. different local multicast areas and multicast addresses are configured with one service ID, the multicast bearer may be removed according to the different multicast addresses respectively, which specifically includes: if the data at a multicast address are no longer sent to the Multicast UPE, the Multicast Controller notifies the eNodeB of a Session Stop message to tell the eNodeB about the multicast address which stops providing the multicast service, and removes the multicast bearer corresponding to the multicast address. If there are multicast bearers which have not been removed from the MBMS Bearer Context, the MBMS Bearer Context will not be deleted; otherwise, the MBMS Bearer Context will be deleted after the multicast bearer is removed.

In actual applications, when the UE leaves the local multicast area and initiates an Multicast service de-registration procedure, the MME will notify the Multicast Controller and/or the eNodeB of an UE Leaving message according to the multicast address provided by the UE. If there is no UE under the control of the Multicast Controller and/or the eNodeB requiring the multicast service provided from the multicast address, the Multicast Controller and/or the eNodeB delete(s) from the MBMS Bearer Context the record corresponding to the multicast address. If on the Multicast Controller and/or the eNodeB, the records of all multicast addresses corresponding to the multicast service of the type are removed, the Multicast Controller and/or the eNodeB may delete the MBMS Bearer Context.

According to the method provided by this embodiment, if the subscriber is roaming, the subscriber may initiate the multicast registration according to the multicast address of Local multicast area 1 acquired before roaming. The BM-SC determines Local multicast area 2 where the subscriber is located currently according to the multicast address of Local multicast area 1, and provides the subscriber with the multicast address which can provide the multicast services of the same type for the subscriber, and which corresponds to Local multicast area 2.

Figure 3:
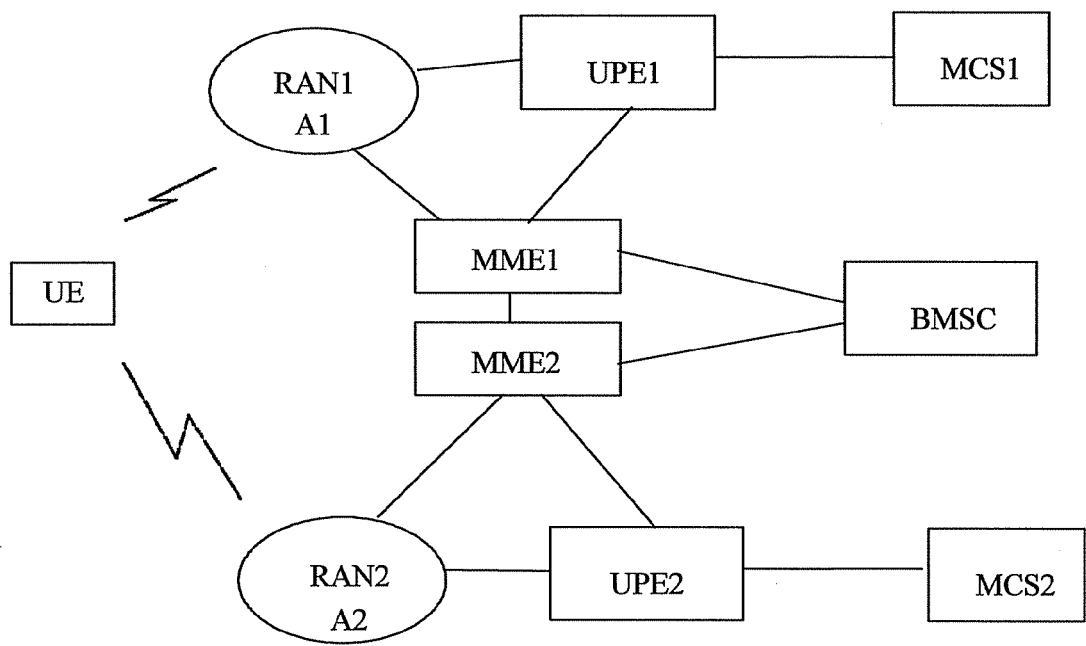
FIG. 3 is a schematic diagram illustrating a network architecture having multiple local multicast areas in an embodiment of the present invention.

FIG. 3 is a schematic diagram illustrating a network architecture having multiple local multicast areas in accordance with one embodiment of the present invention, wherein RAN1 and RAN2 cover local multicast areas A1 and A2 respectively. A detailed description of the process of implementing the multicast service in accordance with the embodiment of the present invention is given with reference to the network architecture as shown in FIG. 3.

Figure 4:
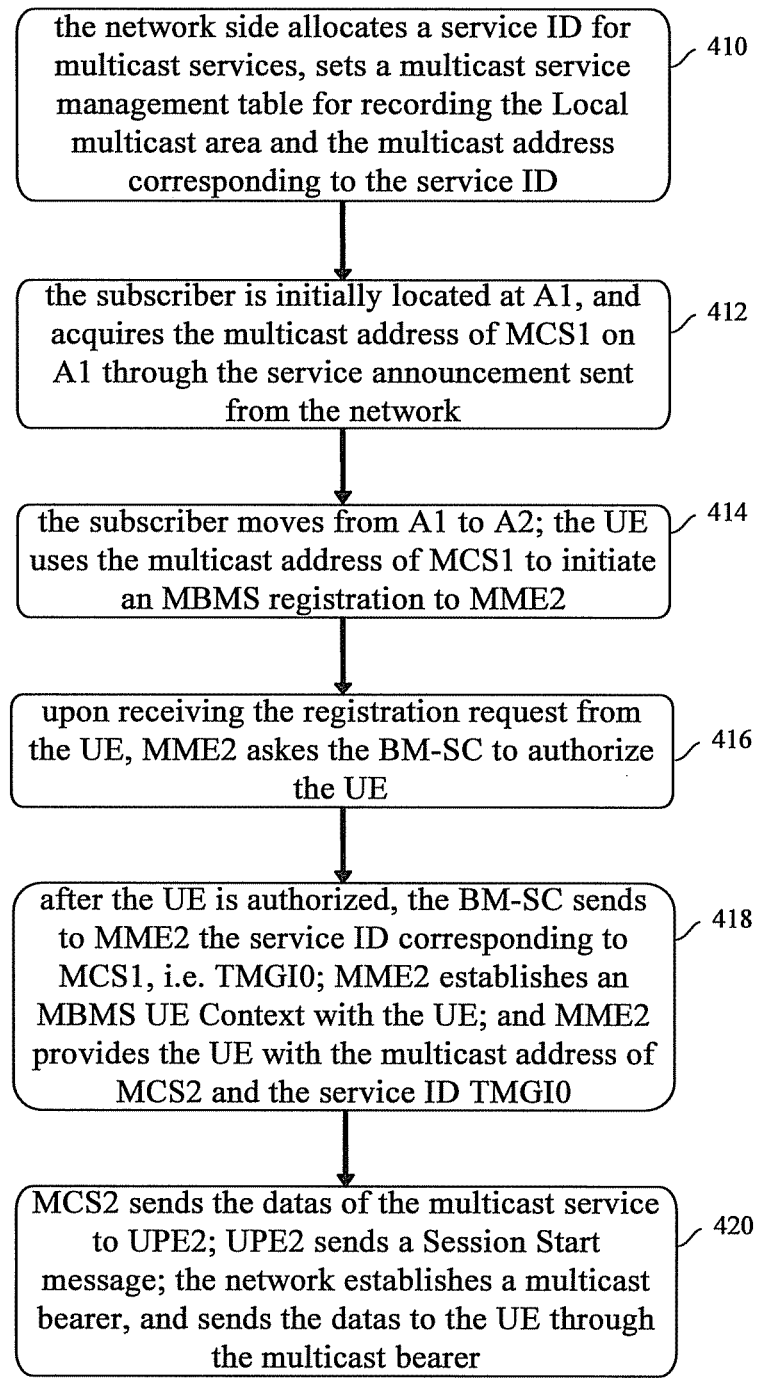
FIG. 4 is a flow chart illustrating the process of implementing multicast services in an embodiment of the present invention.

The case of one embodiment is as follows. A UE receives a service announcement in a first local multicast area (i.e. A1 in the embodiment), thereby acquires a first multicast address pointing to MSC1. Then, the UE leaves A1, and switches to a second multicast area (i.e. A2). At this moment, the UE may initiate an MBMS registration in A2 with the first multicast address. Thus, the situation in which the UE can not register due to missing the service announcement of A2 can be avoided. The specific implementation is as shown in FIG. 4.

Block 410: A multicast service management table is set at the network side, which is used to record the multicast addresses in different local multicast areas used by the multicast services of a same type, and in which a service ID is allocated for multicast services of the same type. One example of the multicast service management table is as shown in Table 3.

TABLE 3

| Service ID | local multicast area | Multicast address |
|---|---|---|
| TMGI0 | A1 | MCS1 |
|  | A2 | MCS2 |

Block 412: the UE, which is located at local multicast area A1 initially, acquires through a service announcement sent from the network of local multicast area A1, the first multicast address of MSC1, which can provide multicast services within local multicast area A1.

If the UE has not moved to another local multicast area, and is located in local multicast area A1 all the time, a normal process is performed. The process specifically includes: the UE initiating an MBMS registration, and establishing an MBMS UE Context; when MSC1 provides the data of the multicast service for UPE1, UPE1 sending a Session Start message; the network side establishing a multicast bearer according to the MBMS Bearer Context, and transmitting the data of the multicast service to the UE through the multicast bearer; the multicast bearer being deleted after the session stops.

If the UE moves from A1 to A2, the process advances to Block 414.

Block 414: the UE initiates the MBMS registration to MME2 with the first multicast address.

Block 416: upon receiving the registration request from the UE, MME2 notifies the BM-SC of authenticating the UE.

Block 418: after the UE is authorized, the BM-SC sending to MME2 a service ID (i.e. TMGI0) corresponding to MSC2. MME2 acquires the location information of the UE while establishing the MBMS UE Context with the UE, thereby acquires the local multicast area where the UE is located currently. After that, the multicast address supported by MME2, which is a second multicast address corresponding to MSC2, is acquired by inquiring the multicast service management table according to the service ID and the local multicast area, and the UE is provided with the second multicast address and the service ID TMGI0. The MME2 updates the MBMS UE Context according to the second multicast address.

Specifically, MME2 may send TMGI0 and the location information (RAN2) where the UE is located currently to the BM-SC; the BM-SC returns the multicast address of MSC2, corresponding to the location information. Or, MME2 may request the BM-SC for the multicast management service table for inquiring.

Additionally, MME2 may notify the Multicast Controller of UPE2 and the eNodeB of RAN2 of information related to the subscriber, wherein the information includes the second multicast address, the local multicast area, a downstream node ID, the service ID, etc.

If the UE is the first subscriber in UPE2 who applies to MSC2 for the multicast service, an MBMS Bearer Context is to be established on the Multicast Controller of UPE2 and the eNodeB of RAN2. Table 4-a shows Multicast Controller parameters, while Table 4-b shows eNodeB parameters.

TABLE 4-a

| Service ID | local multicast area | APN | Multicast address | List of downstream nodes |
|---|---|---|---|---|
| TMGI0 | A2 | UPE2 | MCS2 | RAN2, . . . |

TABLE 4-b

| Service ID | local multicast area | APN | Multicast address | List of UEs in connection mode |
|---|---|---|---|---|
| TMGI0 | A2 | UPE2 | MCS2 | UE1, . . . |

Block 420: MSC2 sends the data of the multicast service to UPE2; UPE2 sends a Session Start message; the network side establishes a multicast bearer according to the MBMS Bearer Context, and transmits the data of the multicast service to the UE through the multicast bearer.

This step can be specifically implemented as follows. When the data arrive at UPE2 from MSC2, the Multicast Controller of the UPE2 sends the MBMS Session Start message to the downstream node recorded in the MBMS Bearer Context, i.e., the eNodeB in the RAN2; Upon receiving the message, the eNodeB of RAN2 establishes the multicast bearer of the multicast service of the type with UPE2; UPE2 sends the data to the UE via RAN2, thereby enables the UE to receive the data of the multicast service at the second local multicast area (that is, A2 in this embodiment).

Figure 5:
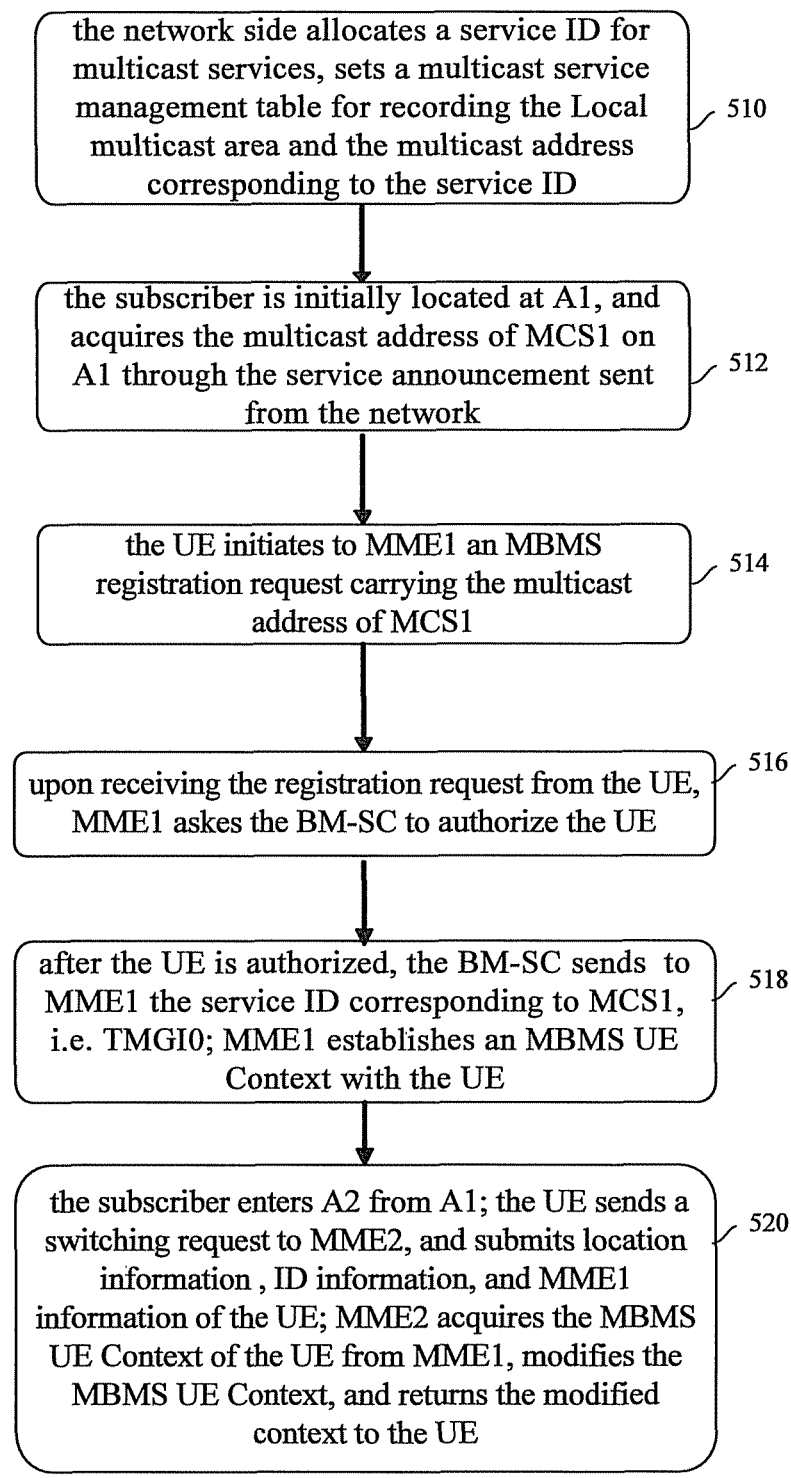
FIG. 5 is a flow chart illustrating the process of implementing multicast services in an embodiment of the present invention.

Another embodiment is as follows. The UE completes an MBMS registration at local multicast area A1, and establishes an MBMS UE Context. At any moment before the session stops, the UE leaves local multicast area A1, and enters local multicast area A2. Under this condition, the UE does not need to establish a new MBMS UE Context at local multicast area A2. The specific procedure is as shown in FIG. 5.

Block 510: a service ID is allocated for multicast services of a same type at the network side. A multicast service management table is set for recording different multicast areas and different multicast addresses corresponding to a service ID, wherein one example of the multicast service management table is as shown in Table 5.

TABLE 5

| Service ID | local multicast area | Multicast address |
|---|---|---|
| TMGI0 | A1 | MCS1 |
|  | A2 | MCS2 |

Block 512: the UE, which is located at the local multicast area A1 initially, acquires a first multicast address of local multicast area A1 through the service announcement sent by the network.

Block 514: the UE initiates an MBMS registration request to MME1, wherein the MBMS registration request includes the first multicast address.

Block 516: upon receiving the registration request from the UE, MME1 notifying the BM-SC to authorize the UE.

Block 518: after the UE is authorized, the BM-SC sending to MM1E the service ID corresponding to MSC1, i.e. TMGI0. MME1 establishes an MBMS UE Context with the UE, and provides the UE with the service ID TMGI0, and the multicast address of MSC1.

In the step, MME1 notifies the Multicast Controller of UPE1 and the eNodeB of RAN1 of the UE's joining.

And then, if the UE stays at local multicast area A1, a normal process is performed. That is, MSC1 sends to UPE1 the data of the multicast service; UPE1 sends a Session Start message; the network establishes a multicast bearer, and transmits the data to the UE through the multicast bearer; the multicast bearer is removed after the session stops.

If the UE enters local multicast area A2 from local multicast area A1, the process advances to Block 520.

Block 520: when the subscriber enters local multicast area A2 from local multicast area A1, the UE sends a switching request to MME2 to submit location information indicating where it is located, ID information of the UE, and MME related information.

The ID information of the UE can be an original Packet Temporary Mobile Subscriber Identifier (P-TMSI; the MME-related information may be an original MME information, or other information used by the network side to differentiate or identify the MME; and the location information may be information reflecting the division of local multicast areas, such as cell information, TA information (similar to RA information of GPRS), etc.

Since the coverage area of each MME is different, MME2 acquires the multicast address of MME1 based on the original MME information and the original P-TMSI, acquires the MBMS UE Context established on MME1, acquires the service ID from the MBMS UE Context, acquires the multicast address of the local multicast area where the UE is located currently by inquiring the multicast service management table according to the service ID and the location information of the UE, and receives the multicast service from the multicast address.

The process of inquiring the multicast service management table includes: upon receiving the multicast service request, MME2 sending TMGI0 and the location information (RAN2) of the UE to the BM-SC; the BM-SC returning the multicast address of MSC2, corresponding to the location information; or, the MME2 requesting the BM-SC for the multicast management service tale to inquire.

While acquiring the second multicast address of MSC2, MME2 further modifies the MBMS UE Context acquired from MME1, for example, changes the first multicast address recorded therein to the second multicast address, and then returns the changed MBMS UE Context to the UE. The UE updates the parameters according to the MBMS UE Context.

TABLE 6

| Service ID | APN | Multicast address |
|---|---|---|
| TMGI0 | UPE2 | MCS2 |

After the above updates, the UE is able to continue receiving the multicast service of the same type at local multicast area A2 where the UE is located currently. It should be noted that, if the UE is the first subscriber applying for acquiring the multicast service from the multicast address A2, the Multicast Controller of UPE2 and the eNodeB of RAN2 should be notified of the UE's joining after the UE updates the MBMS UE Context. The Multicast Controller and the eNodeB establish an MBMS Bearer Context according to the new multicast address.

After updating the MBMS UE Context, MME2 notifies MME1 of the completion of switching, and MME1 deletes information related to the UE. If the UE is the only subscriber of the MSC1, since no more subscriber applies for multicast services from MCS1, MM1 notifies the Multicast Controller of UPE1 and the eNodeB of RAN1 to remove the MBMS UE Context, the MBMS Bearer Context, and the multicast bearer. UPE1 further sends an IGMP leaving message to MSC1.

In addition, MME2 and the UE update the MBMS UE Context, and inform UPE2 and RAN2 that the UE has joined the multicast service. UPE2 sends an IGMP joining message to MSC2, establishes a multicast bearer with RAN2, and continues to provide the subscriber with the multicast service of the type.

When the multicast service stops, UPE2 stops receiving the multicast service from MSC2; the Multicast Controller of UPE2 sends a Session Stop message to its downstream node (including the eNodeB of RAN2); and the eNodeB deletes the multicast bearer between itself and UPE2.

The multicast service de-registration process may be initiated by the UE, which specifically includes: the UE sending an IGMP leaving message to UPE2; MME2 sending the message to the BM-SC, and notifying the Multicast Controller of UPE2 and the eNodeB of RAN2. If MSC2 provides the multicast service only for the UE, the Multicast Controller and the eNodeB delete the MBMS Bearer Context.

When the multicast bearer is removed, if a certain UPE covers a plurality of local multicast areas, the network side removes the multicast bearer according to the multicast address. For instance, provided that UPE2 covers the local multicast areas RAN2/A2 and RAN3/A3; a multicast source MCS3 within local multicast area A3 provides the multicast service of the same type as that provided by MSC2, and there are other subscribers existing on MCS3. Upon receiving the UE leaving message from MME2, UPE2 removes the multicast bearer corresponding to MCS2, deletes from the MBMS Bearer Context an item corresponding to MCS2, and keeps the item corresponding to MCS3.

Another embodiment is as follows. It is assumed that there are two multicast sources: MCS1 and MCS2, wherein MCS1 serves within local multicast area A1 which is covered by RAN1 and MCS2 serves within local multicast area A2 which is covered by RAN2.

Different local multicast areas use different multicast bearers identified by different service IDs. The above-mentioned service IDs are set as equivalence, so as to guarantee that a subscriber can receive multicast services of a same type in different local multicast areas.

Figure 6:
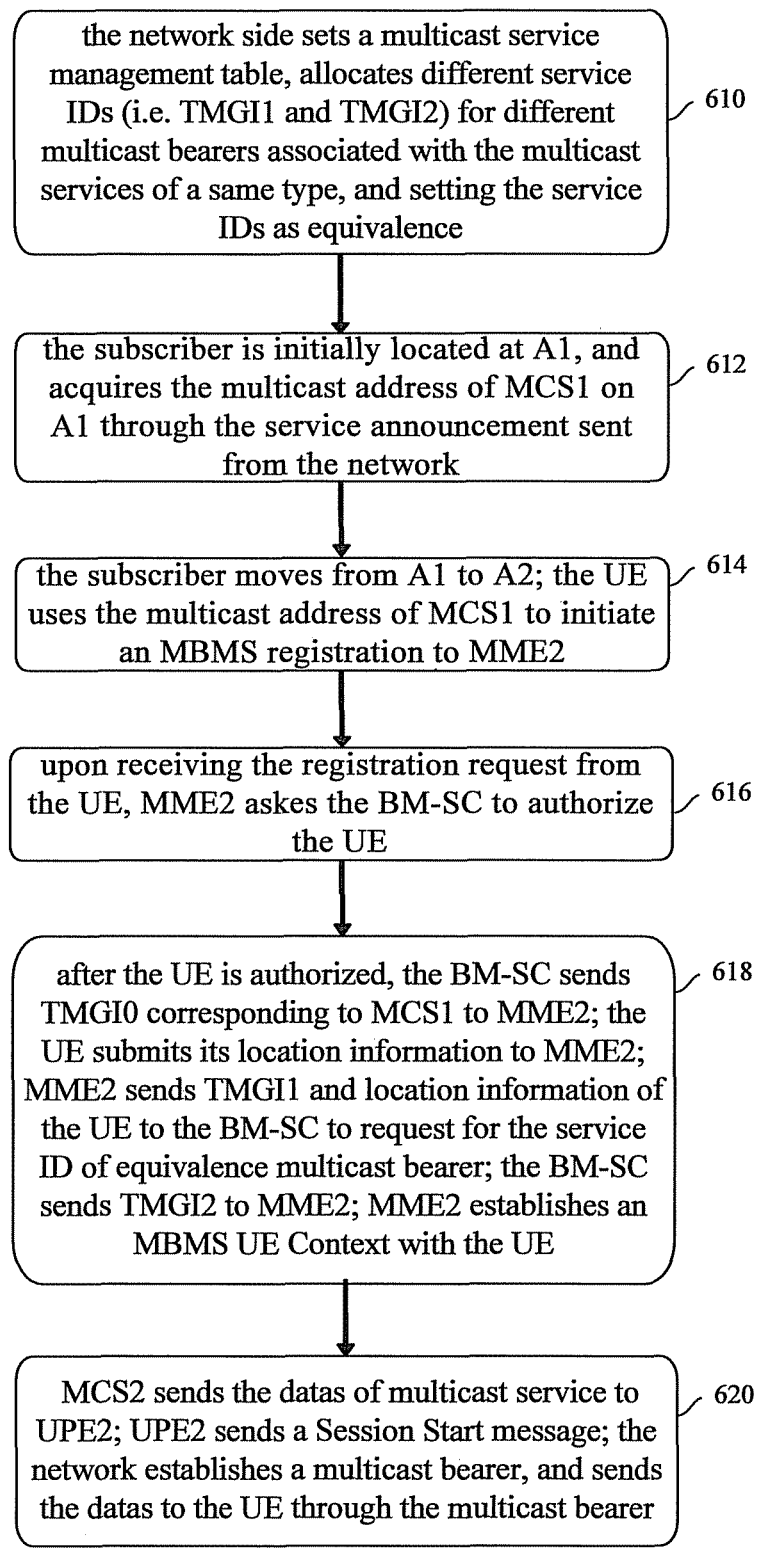
FIG. 6 is a flow chart illustrating the process of implementing multicast services in an embodiment of the present invention.

For example, the multicast service on MCS1 is born on the multicast bearer whose service ID is TMGI1; the multicast service on MCS2 is born on the multicast bearer whose service ID is TMGI2; and TMGI1 and TMGI2 are set as equivalence. The UE receives the service announcement at local multicast area A1 and acquires a first multicast address of A1, and then enters local multicast area A2. In this case, the UE can still use the first multicast address provided by local multicast area A1 to initiate the registration, and the specific processes are as shown in FIG. 6.

Block 610: a multicast service management table is set; a service ID is allocated for each local multicast area, and service IDs of local multicast areas associated with the multicast services of a same type are set as equivalence.

Through the above configuration, an operator can provide different data in different local multicast areas for the multicast services of a same type.

Block 612: the UE which is initially located in local multicast area A1 acquires the multicast address of MCS1 through the service announcement.

If the subscriber does not move before initiating the MBMS registration, the process advances to a normal process. That is, the UE initiates the MBMS registration and establishes an MBMS UE Context; MSC1 sends the multicast service to UPE1; UPE1 sends a Session Start message; the network establishes a multicast bearer according to the MBMS Bearer Context, and sends the multicast service to the UE through the multicast bearer; and removes the multicast bearer after the session stops.

If the subscriber has moved to A2 before initiating the MBMS registration, the process advances to Block 614.

Block 614: the UE initiates the MBMS registration using the multicast address of MCS1.

Block 616: upon receiving the MBMS registration request from the UE, MME2 sending the MBMS registration request to the BM-SC to authorize the UE.

Block 618: after the UE is authorized, the BM-SC sends the service ID (i.e. TMGI1) corresponding to MCS1 to MME2. MME2 and the UE establishes an MBMS UE Context, during which the UE submits location information such as local multicast area information in the form of cell information, TA information (equaling to RA information of GRPS), etc. MME2 sends TMGI1 and the location information of the UE to the BM-SC to acquire the service ID of the equivalence multicast bearer. The BM-SC sends to MME2 the multicast address of MCS2 and TMGI2 which is the service ID of the multicast bearer serving at the location where the UE is currently located and is equivalent to TMGI1. MME2 and the UE establish an MBMS UE Context; and MME2 provides the UE with the multicast address of MCS2 and TMGI2.

Additionally, MME2 notifies the Multicast Controller of UPE2 and the eNodeB of RAN2 of the UE's joining. If the UE is the first subscriber in local multicast area A2 applying for the multicast service of the type, the Multicast Controller of UPE2 and the eNodeB of RAN2 further establish an MBMS Bearer Context according to the multicast address of MCS2.

Block 620: MSC2 sends the data of the multicast service to UPE2; UPE2 sends a Session Start message; the network side establishes a multicast bearer, and transmits the multicast service to the UE through the multicast bearer.

The step can be specifically implemented as follows. UPE2 sends an IGMP Joining message to MCS2. When the data arrive at UPE2 from MSC2, the Multicast Controller of UPE2 sends an MBMS Session Start message to a downstream node recorded in the MBMS Bearer Context. Upon receiving the message, the eNodeB of RAN2 establishes a multicast bearer with UPE2. UPE2 sends the data to RAN2 with the multicast bearer, and then sends to the UE.

If the subscriber is roaming, VPLMN sets the service ID that the subscriber applies for and the service ID which signs a roaming protocol with VPLMN as equivalence according to the roaming protocol. When the subscriber initiates a registration, VPLMN continues to provide the multicast service for the subscriber by replacing the former service ID with the latter service ID.

Figure 7:
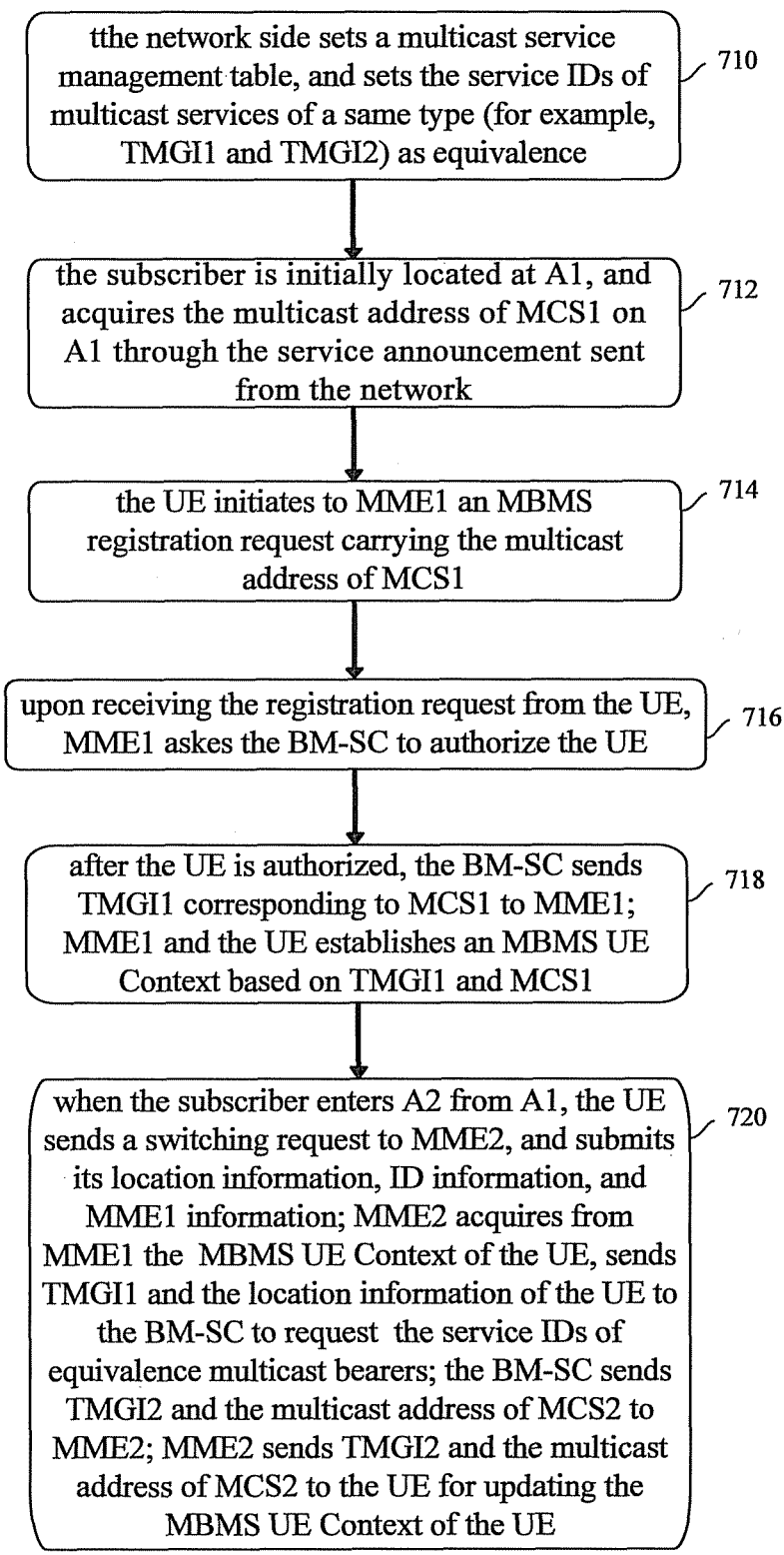
FIG. 7 is a flow chart illustrating the process of implementing multicast services in an embodiment of the present invention.

Another embodiment is as follows: It is assumed that there are two multicast sources MCS1 and MCS2, wherein MCS1 serves at local multicast area A1 and MCS2 serves at local multicast area A2; the UE completes the MBMS registration at local multicast area A1, and establishes an MBMS UE Context; before the session stops, the UE leaves local multicast area A1, and enters local multicast area A2. Under this condition, the UE does not need to register and establish the MBMS UE Context again. The specific implementing procedure is as shown in FIG. 7.

Block 710: the network side sets service IDs of two multicast bearers corresponding to multicast services of a same type as equivalence service ID, the specific configuration is as shown in Table 7.

TABLE 7

| Service ID | local multicast area | Multicast address |
|---|---|---|
| TMGI1 | A1 | MCS1 |
| TMGI2 | A2 | MCS2 |

Block 712: the subscriber, which is located at A1 initially, acquires the multicast address of MCS1 through a service announcement.

Block 714: the UE initiates an MBMS registration request to MME1, wherein the MBMS registration request includes a multicast address of MSC1.

Block 716: upon receiving the MBMS registration request from the UE, MME1 sends the MBMS registration request to the BM-SC to authorize the UE.

Block 718: after the UE is authorized, the BM-SC sends to MME1 the service ID corresponding to MCS1, i.e. TMGI1. MME1 establishes an MBMS UE Context with the UE, wherein the MBMS UE Context is based on TMGI1 and the multicast address of MCS1. Additionally, MME1 notifies the Multicast Controller of UPE1 and the eNodeB of RAN1 of the UE's joining.

If the UE stays at local multicast area A1, a normal process is performed. That is, MSC1 sends to UPE1 the multicast service; UPE1 sends a Session Start message; the network establishes a multicast bearer, transmits the data to the UE through the multicast bearer, and removes the multicast bearer after the session stops. If the UE is the first subscriber in local multicast area A1 applying for the multicast service, the Multicast Controller of UPE1 and the eNodeB of RAN1 further establish an MBMS Bearer Context according to the multicast address of MCS1.

If the UE enters RAN2 from the access network RAN1, that is, enters local multicast area A2 from local multicast area A1, the process advances to Block 720.

Block 720: when the subscriber enters RAN2 from RAN1, the UE sends a switching request to MME2, and submits information about location where the UE is located currently, ID information of the UE and MME-related information.

The ID information of the UE may be an original P-TMSI, the MME-related information may be original location information, or other information for the network side differentiating or identifying MMEs.

MME2 acquires the address of MME1 according to the original location information, acquires the MBMS UE Context established on the original MME1 according to the ID information of the UE, and acquires the service ID TMGI1 from the MBMS UE Context.

Then, MME2 sends the service ID TMGI1 and the location information of the UE to the BM-SC, so as to acquire the service ID of the equivalence multicast bearer. The BM-SC sends to MME2 the multicast address of MCS2 and the service ID TMGI2, which is equivalent to TMGI1 and is of the multicast bearer serving at the current location of the UE.

After updating the MBMS UE Context between MME2 and the UE, MME2 sends TMGI2 and the multicast address of MCS2 to the UE; and the UE receives the multicast service provided by MCS2 from the eNodeB of RAN2. And then, MME2 notifies MME1 of switching completion; and MME1 deletes information related to the UE. At this time, if no other subscriber on MCS1 applies for the multicast service of the type, MME1 notifies the Multicast Controller of UPE1 and the eNodeB of RAN1 to delete the MBMS Bearer Context; and UPE1 sends an IGMP leaving message to MCS1. If no other subscribers on MCS2 applies for the multicast service before the UE switches to MME2, MME2 notifies the Multicast Controller of UPE2 and the eNodeB of RAN2 of the UE's joining after updating the MBMS UE Context. The Multicast Controller and eNodeB establish an MBMS Bearer Context; and UPE2 sends to MCS2 an IGMP joining message. Upon receiving the data, UPE2 establishes a multicast bearer with RAN2, and continues to provide the multicast service for the subscriber.

When the multicast service stops, UPE2 stops receiving the data from MSC2; the Multicast Controller of UPE2 sends a Session Stop message to its downstream node (including the eNodeB of RAN2); and the eNodeB removes the multicast bearer between itself and UPE2. The UE initiates a multicast service de-registration procedure in which the UE sends an IGMP leaving message to UPE2. After receiving the message, MME2 sends the message to the BM-SC, and notifies the Multicast Controller of UPE2 and the eNodeB of RAN2.

It can be seen that, FIG. 4 shows the case that the UE moves before registration, and multicast services of a same type are allocated one service ID. FIG. 5 shows the case that the UE moves after the registration, and multicast services of a same type are allocated one service ID. FIG. 6 illustrates the case that the UE moves before the registration, multicast services of a same type are allocated multiple service IDs, and the multiple service IDs are associated by being set as equivalence. FIG. 7 illustrates the case that the UE moves after registration, multicast services of a same type are allocated multiple service IDs, and the multiple service IDs are associated by being set as equivalence.

According to an embodiment of the present invention, a service area list can be set in an MME to facilitate acquiring information related to the multicast service provided in the multicast area where the UE is located currently, and to reduce instruction interaction between network devices. Table 8 is a specific embodiment of the service area list. It is easily understood that actual applications are not limited to this format.

TABLE 8

| Multicast address | local multicast area | Equivalence multicast address |
| --- | --- | --- |
|  |  |  |

Generally, the service area list is stored in MME, and includes multicast address, local multicast area, equivalence multicast address, etc. The local multicast area refers to an area in which the multicast address provides the multicast service. The equivalence multicast address refers to the multicast address in another local multicast area, which can provide multicast services of a same type. In Table 8, each multicast address is allocated an item.

The service area list can be in any one of the following formats:

Format one: the corresponding relationship among a multicast address supported in a network, a local multicast area, and an equivalence multicast address is recorded, wherein the multicast address refers to the multicast source providing the multicast service.

Format two: the corresponding relationship among a multicast address supported in a network, a local multicast area, and an equivalence multicast address is recorded, wherein the local multicast area is limited to the area covered by the current MME; if there are no areas covered by the current MME, the item is null;

Format three: the corresponding relationship among a multicast address of MCS in the area covered by the current MME, which is supported by the network, a local multicast area, and an equivalence multicast address is recorded.

When the UE switches between different local multicast areas, the MME acquires the location information of the UE and the original multicast address, and finds the item of the original multicast address from the service area list stored on the MME. If the local multicast area corresponding to the original multicast address does not accord with the location information of the UE, the MME finds all equivalence multicast addresses of the original multicast address, determine the equivalence multicast address in the local multicast area according with the location information of the UE, i.e. a valid multicast address, and establishes or updates the MBMS UE Context, the MBMS Bearer Context according to the valid multicast address to establish a corresponding bearer.

Specifically, if the UE has not moved between areas from the beginning of the multicast service until the end of the multicast service, it can be determined according to the service area list that the location information of the UE accord with the multicast address provided, that is, the multicast address and the local multicast area satisfy the corresponding relationship recorded in the service area list.

If the UE switches between different local multicast areas corresponding to the multicast services of a same type, the MME acquires the location information of the UE, the service ID and the original multicast address. While establishing or updating the MBMS UE Context, it can be determined according to the service area list that the location information of the UE does not accord with the original multicast address. And then, the MME acquires the valid multicast address of the local multicast area where the UE is located currently according to the service area list, and updates the MSC multicast address of the UE to the valid multicast address.

Further, if there is no item of the original multicast address in the service area list of MME, or there is no item of the equivalence multicast address, the MME will request the BM-SC for the absent item, i.e. the local multicast area or the equivalence multicast address corresponding to the multicast address. Upon receiving the request from MME, the BM-SC sends the corresponding items to the MME to be recorded in the service area list. Still further, if the MME requests the item of the original multicast address, the BM-SC provides the items of the original multicast address for MME, and returns the items of all equivalence multicast addresses of the original multicast address to the MME as well.

In actual applications, after setting related information of the multicast service of a certain type or setting the multicast service management table, the BM-SC can notify all MMEs of the corresponding relationship among the multicast address, the local multicast area, and the equivalence multicast address; and the MME records or updates the service area list accordingly. Further, if the local multicast area of the multicast service of a certain type changes, for example, becomes larger or smaller, the BM-SC will send to the MME a service area update message, and the MME updates the service area list according to the service area update message.

In the case that the service area list is in the Format two, and the BM-SC learns that the multicast service of the type is not provided in the network any more, the BM-SC will ask the MME to delete the items of all multicast addresses related to the multicast service of the type.

In the case that the service area list is in the Format one or the Format three, if all subscribers enjoying the multicast service provided by the MCS or the multicast service provided by MCSs with multicast addresses equivalent to the MCS leave the MME, the MME deletes from the service area list the items corresponding to the above-mentioned multicast addresses.

According to an embodiment of the present invention, when a certain subscriber moves from the coverage area (referred to as a source cell) of one eNodeB to the coverage area (referred to as a destination cell) of another eNodeB, the subscriber will listen to the broadcast channel of the cell, so as to learn which broadcast services are provided in the destination cell. If wanting to acquire one or more broadcast services, the subscriber acquires the corresponding broadcast service(s) in the destination cell by submitting the ID(s) of the broadcast service(s) to be received.

Provided that there are two broadcast sources MCS1 and MCS2 in a 3GPP network, wherein MCS1 provides broadcast services within Local broadcast area A1 covered by RAN1 and MCS2 provides broadcast services within Local broadcast area A2 covered by RAN2.

A broadcast service of a certain type, S, uses a broadcast bearer with a service ID TMGI1 on MCS1, and uses a broadcast bearer with a service ID TMGI2 on MCS2. The two bearers use an enhanced broadcast mode to transmit data in the air.

The enhanced broadcast refers to counting subscribers in the air. If there are subscribers, the data of broadcast service are transmitted. If the number is relatively low, a point-topoint transmit channel is used. If the number is relatively large, a point-to-multipoint transmit channel is used. In the enhanced broadcast mode, when the broadcast service starts, the eNodeB of an access network will send an MBMS service change message to all UEs, wherein the MBMS service change message carries the service ID of the MBMS. Upon receiving the message, the UE will submit a response message to the eNodeB if it decides to receive the broadcast service of the type according to the service ID. The eNodeB acquires the number of subscribers requiring to receive the broadcast service of the type by counting the response message.

Provided that the UE is initially located at Local broadcast area A1, and receives the broadcast service through TMGI1. Then, the UE moves from the eNodeB of RAN1 to the eNodeB of RAN2. It is assumed that the network side (for example, an MME having a broadcast service management table set thereon) has established an association relationship between TMGI1 and TMGI2. If the UE subscribes the broadcast service of the type, S, the network side sends the association relationship to the UE through the service announcement.

In a specific embodiment, the UE finds, through the system broadcast in A2, that TMGI2 is used to send the broadcast service in the current area. The UE submits the response message to the eNodeB according to the association relationship between TMGI2 and TMGI1. Then, the eNodeB may use the enhanced broadcast manner to provide the broadcast service for the UE through TMGI2.

According to another specific embodiment, the UE sends a Service Request to MME2; upon receiving the request message, MME2 acquires TMGI1 requested by the UE, and determines that there is no broadcast bearer with the service ID TMGI1 in A2. And then, the eNodeB inquires the broadcast service management table, determines that the service ID associated with TMGI1 is TMGI2, and provides the broadcast service for the UE through the broadcast bearer indicated by TMGI2.

According to another embodiment of the present invention, a system for implementing Multimedia Broadcast/Multicast Service (MBMS) is provided, which includes:

at least one User Equipment (UE) receiving MBMS, and switching between different MBMS service areas;

a first network unit for establishing an association relationship between different multimedia broadcast multicast bearers associated with MBMS of a same type, wherein the MBMS are born on different multimedia broadcast multicast bearers, and each multimedia broadcast multicast bearer corresponds to one multimedia broadcast multicast area;

a second network unit for providing the UE with the multimedia broadcast multicast bearer of the multimedia broadcast multicast area where the UE is located, according to the association relationship between the different multimedia broadcast multicast bearers corresponding to the MBMS requested by the UE.

Further, the UE receives a service announcement from a first local multimedia broadcast multicast area to acquire a first multicast address corresponding to the first local multimedia broadcast multicast area. If the UE switches to a second local multimedia broadcast multimedia area before implementing an MBMS registration, the UE uses the first multicast address to initiate the MBMS registration at the second local multimedia broadcast multicast area.

The second network unit is configured to acquire the location information of the UE, inquire the MBMS management table, acquire the second multicast address corresponding to the second local multimedia broadcast multicast area, and establish an MBMS Context according to the second multimedia multicast address.

Still further, the UE is used to complete the MBMS registration at the first local multimedia broadcast multicast area, and submit to the network side the location information of the UE when switching to the second local multimedia broadcast multicast area before the MBMS stops.

The second network unit is configured to search the MBMS management table according to the location information of the UE, acquire the second multicast address corresponding to the second local multimedia broadcast multicast area, and establish an MBMS Context at the second local multimedia broadcast multicast area according to the second multimedia multicast address.

The MBMS management table is stored in the first network unit.

For the multicast service, the first network unit is an BM-SC, and the second network unit is an MME. For the broadcast service, the first network unit is an MME, and the second network unit is an eNodeB.

To sum up, the embodiments of the present invention provide a method for implementing MBMS, so that the subscriber can access a new local multicast area better to receive the multicast service when switching between areas. The foregoing description includes only embodiments of the present invention and is not for use in limiting the protection scope thereof.

What is claimed is:

1. A method for implementing Multimedia Broadcast/Multicast Service (MBMS), wherein MBMS are born on different multimedia broadcast multicast bearer services, and each multimedia broadcast multicast bearer service corresponds to a multimedia broadcast multicast area respectively, comprising:

establishing an association relationship between different multimedia broadcast multicast bearer services of MBMS of a same type at a network side, and establishing the different multimedia broadcast multicast bearer services for different multimedia broadcast multicast areas based on the association relationship; and in response to a User Equipment (UE) switching between different multimedia broadcast multicast areas, the network side providing the UE with a multimedia broadcast multicast bearer service of a multimedia broadcast multicast area where the UE is located currently, according to the association relationship between different multimedia broadcast multicast bearer service corresponding to the MBMS requested by the UE;

wherein the data of MBMS of the same type differ in different broadcast multicast areas;

wherein the establishing the association relationship between the different multimedia broadcast multicast bearer services of the MBMS of the same type comprises:

setting in a Broadcast Multicast-Service Center BM-SC a multimedia broadcast multicast service management table, and recording a corresponding relationship among a service ID, at least one local multimedia broadcast multicast area, and at least one multimedia multicast address, wherein one local multimedia broadcast multicast area and one multicast address correspond to one multimedia broadcast multicast bearer service.

2. The method of claim 1, wherein the process of establishing the association relationship between different multimedia broadcast multicast bearer services of MBMS of a same type comprises:
using different service IDs to identify the different multimedia broadcast multicast bearer services of MBMS of a same type, and setting the service IDs as equivalence.

3. The method of claim 1, wherein the process of the UE switching between different multimedia broadcast multicast areas and the network side providing the UE with the multimedia broadcast multicast bearer service of the multicast broadcast multicast area where the UE is located currently comprises:
the UE completing an MBMS registration at a first local multimedia broadcast multicast area;
before the MBMS stops, the UE switching to a second local multimedia broadcast multicast area, and submitting to the network side its location information; and
the network side acquiring a second multicast address corresponding to the second local multimedia broadcast multicast area by inquiring the multimedia broadcast multicast service management table, and establishing an MBMS Context at the second local multimedia broadcast multicast area according to the second multimedia multicast address.

4. The method of claim 3, wherein the process of the UE submitting its location information and the network side acquiring the second multicast address comprises:
the UE sending to the network side the switching request, submitting its location information, ID information and original MME information; and
the network side acquiring the MBMS UE Context of the UE from the original MME according to the original MME information and the ID information of the UE, acquiring a service ID from the MBMS UE Context, and acquiring the second multicast address corresponding to the second multimedia broadcast multicast area by inquiring the multimedia broadcast multicast service management table according to the service ID and the location information of the UE.

5. The method of claim 3, wherein the process of establishing the MBMS Context comprises:
determining whether there are other subscribers applying the MBMS of the type at the second local multimedia broadcast multicast area; and
if there are other users applying the MBMS, updating the MBMS UE Context according to the second multimedia multicast address; or if the UE is the first subscriber applying the MBMS of the type at the second local multimedia broadcast multicast area, updating the MBMS UE Context according to the second multimedia multicast address, and establishing an MBMS Bearer Context.

6. The method of claim 1, further comprising:
setting a service area list at an MME, wherein the service area list records a corresponding relationship among a multimedia multicast address, a local multimedia broadcast multicast areas and equivalent multimedia multicast addresses.

7. The method of claim 6, wherein the process of the UE switching between different multimedia broadcast multicast areas and the network providing the UE with the multimedia broadcast multicast bearer service of the multicast broadcast multicast area where the UE is located currently comprises:
when the UE switches between different multimedia broadcast multicast bearer services, the MME inquiring the service area list according to the location information of the UE and a first multicast address to determine a second multicast address corresponding to the location information of the UE, and establishing or updating an MBMS UE Context according to the second multimedia multicast address.

8. The method of claim 7, further comprising:
in response to there being no record items corresponding to the first multicast address in the service area list, the MME requesting an BM-SC for an equivalence multimedia multicast address corresponding to the first multimedia multicast address;
the BM-SC sending information of the equivalence multicast address and the local multimedia broadcast multicast area to the MME; and
the MME recording the first multimedia multicast address, the local multimedia broadcast multicast areas corresponding to the first multicast address and the equivalence multicast address in the service area list.

9. The method of claim 7, further comprising:
the BM-SC sending the corresponding relationship among the multimedia multicast address, the local multimedia broadcast multicast area and the equivalence multicast address to the MME; and
the MME recording the corresponding relationship in the service area list.

10. The method of claim 7, further comprising:
if the local multimedia broadcast multicast area where the MBMS is provided is updated, the BM-SC sending to the MME a service area updating message; and
the MME updating the service area list.

11. The method of claim 1, wherein the process of the UE switching between different multimedia broadcast multicast areas and the network providing the UE with the multimedia broadcast multicast bearer service of the multimedia broadcast multicast area where the UE is located currently comprises:
the UE moving from a first Local broadcast area to a second Local broadcast area, determining that the second Local broadcast area uses a second broadcast bearer service, determining whether the second broadcast bearer service and the first broadcast bearer service used in the first Local broadcast area are associated;
if the second broadcast bearer service and the first broadcast bearer service used in the first Local broadcast area are associated, submitting to an eNodeB a response message; and
the eNodeB providing the UE with broadcast services through the second broadcast bearer service in an enhanced broadcast manner.

12. The method of claim 1, wherein the process of the UE switching between different multimedia broadcast multicast areas and the network providing the UE with the multimedia broadcast multicast bearer service of the multicast broadcast multicast area where the UE is located currently comprises:
the UE moving from a first Local broadcast area to a second Local broadcast area, and requesting to acquire the broadcast service through a first broadcast bearer service;
the network side inquiring a broadcast service management table according to an ID of the first broadcast bearer service, determining whether a second broadcast bearer service of a second Local broadcast area is associated with the first broadcast bearer service; and
if the second broadcast bearer service of the second Local broadcast area is associated with the first broadcast bearer service, providing the UE with the broadcast services through the second broadcast bearer service in an enhanced broadcast manner.

13. A system for implementing Multimedia Broadcast/Multicast Service (MBMS), comprising:
   at least one User Equipment (UE) receiving MBMS, and switching between different MBMS service areas;
   a first network unit for setting in a Broadcast Multicast-Service Center BM-SC a multimedia broadcast multicast service management table, recording a corresponding relationship among a service ID, at least one local multimedia broadcast multicast area, and at least one multimedia multicast address, wherein one local multimedia broadcast multicast area and one multicast address correspond to one multimedia broadcast multicast bearer service; and establishing the different multimedia broadcast multicast bearer services for different multimedia broadcast multicast areas based on the association relationship, wherein the MBMS of the type are born on different MBMS bearer services, and each MBMS bearer service corresponds to one MBMS service area; and
   a second network unit for providing the UE with the multimedia broadcast multicast bearer service of the multimedia broadcast multicast area where the UE is located currently, according to the association relationship between different multimedia broadcast multicast bearer services corresponding to the MBMS requested by the UE;
   wherein the data of MBMS of the same type differ in different broadcast multicast areas.

14. The system of claim 13, wherein
   the UE is configured to receive a service announcement from a first local multimedia broadcast multicast area, acquire a first multicast address corresponding to the first local multimedia broadcast multicast area, switch to a second Local multimedia broadcast multimedia area before initiating an MBMS registration, and initiate, with the first multicast address, an MBMS registration at the second local multimedia broadcast multicast area; and
   the second network unit is configured to acquire location information of the UE, inquire an MBMS management table to acquire a second multicast address corresponding to the second local multimedia broadcast multicast area, and establish an MBMS Context according to the second multimedia multicast address.

15. The system of claim 13, wherein
   the UE is configured to complete an MBMS registration at a first local multimedia broadcast multicast area, switch to a second local multimedia broadcast multicast area before the MBMS stops, and submit location information of the UE to a network side; and
   the second network unit is configured to inquire an MBMS management table according to location information of the UE to acquire a second multicast address corresponding to the second local multimedia broadcast multicast area, and establish an MBMS Context at the second local multimedia broadcast multicast area according to the second multimedia multicast address.

16. The system of claim 13, wherein the first network unit is a BM-SC, and the second network unit is an MME.

17. The system of claim 13, wherein the first network unit is an MME, and the second network unit is an eNodeB.

* * * * *

UNITED STATES PATENT AND TRADEMARK OFFICE
CERTIFICATE OF CORRECTION

PATENT NO. : 8,521,196 B2  
APPLICATION NO. : 11/764329  
DATED : August 27, 2013  
INVENTOR(S) : Rui Wang Page 1 of 1

It is certified that error appears in the above-identified patent and that said Letters Patent is hereby corrected as shown below:

Title page, Item 57 Abstract Line 4 "broadcast multicast bearers corresponds to a" should read -- broadcast multicast bearer corresponds to a --.

Signed and Sealed this  
Twelfth Day of November, 2013

Teresa Stanek Rea  
*Deputy Director of the United States Patent and Trademark Office*